United States Patent [19]

Mullins

[11] Patent Number: 4,721,529

[45] Date of Patent: Jan. 26, 1988

[54] ASPHALTIC COMPOSITIONS

[75] Inventor: Troy E. Mullins, Casper, Wyo.

[73] Assignee: Unichem International, Inc., Hobbs, N. Mex.

[21] Appl. No.: 822,782

[22] Filed: Jan. 27, 1986

[51] Int. Cl.$^4$ .............................................. C08L 95/00
[52] U.S. Cl. .................................. 106/281 N; 208/44; 106/273 N
[58] Field of Search ............... 106/281 N, 273 N, 277; 208/44

[56] References Cited

U.S. PATENT DOCUMENTS

| | | | |
|---|---|---|---|
| 2,438,318 | 3/1948 | Johnson | 106/281 |
| 2,469,728 | 5/1949 | Holmes | 106/281 |
| 2,508,430 | 5/1950 | Smith et al. | 106/273 |
| 2,508,432 | 5/1950 | Smith et al. | 106/273 |
| 2,582,823 | 1/1952 | Fowkes | 106/281 |
| 2,582,824 | 1/1952 | Fowkes | 106/281 |
| 2,773,777 | 12/1956 | Alexander et al. | 106/96 |
| 2,901,372 | 8/1959 | Dybalski et al. | 106/281 N |
| 4,038,102 | 7/1977 | Hellsten et al. | 106/281 N |
| 4,351,750 | 9/1982 | Ferm et al. | 106/277 |
| 4,412,864 | 11/1983 | Kurashige et al. | 106/281 N |
| 4,462,840 | 7/1984 | Schilling et al. | 106/281 N |

*Primary Examiner*—Amelia Burgess Yarbrough
*Attorney, Agent, or Firm*—Sigalos & Levine

[57] ABSTRACT

An asphaltic composition comprising an asphalt admixed with an aggregate and at the interface between said asphalt and said aggregate the reaction product of an amine antistrip and an acid salt in an amount sufficient to bind said asphalt to said aggregate; said acidic salt being a divalent or trivalent metal salt of an inorganic acid.

12 Claims, No Drawings

ASPHALTIC COMPOSITIONS

BACKGROUND OF THE INVENTION

Asphaltic compositions useful for building of roadways, driveways and the like are well known and in addition to the bituminous material therein contain aggregates in order to increase the strength and long life of such surfaces.

One problem that has long existed with such asphaltic compositions containing aggregate has been the inability to get the desired degree of adhesion of the asphaltic materials to the aggregate; it tends to strip away from the aggregate. In fact this problem is so well known that certain materials added to ameliorate this problem are referred to as "antistrip" materials. A great deal of work has been done in order to prevent the asphalt from stripping away from the aggregate which leads to raveling, loss of aggregate, and other deterioration of the paved surface, particularly under the rigors of heavy traffic.

At the present time a variety of different materials are added as antistripping agents and these include lime as well as a variety of lignins and amine compounds. Even these materials do not satisfactorily operate to give the necessary antistrip characteristics required.

Various efforts to improve adhesion are detailed in patents such as U.S. Pat. Nos. 2,582,823 and 2,582,824 to Fowkes in which the amine type of antistripping agents or the use of acids and soaps, as well as the use of lime, are discussed and their disadvantages noted. In an attempt to improve these well-known problems, with respect to cut-back asphaltic compositions, there is disclosed a priming solution to be used to attain this better adhesion. For this purpose Fowkes discloses using alkaline metal salts of certain inorganic acids to form a wet aggregate which is admixed with the cut-back asphalt. Such priming solution does not give the necessary adhesion, does not work with all types of aggregates, and does not work satisfactorily with hot-mix asphaltic compositions. Under the press of heavy traffic the resultant compositions crack and lose whatever alleged antistripping function they possess.

U.S. Pat. No. 2,469,728 describes another effort to improve the adhesion of the asphalt to the mineral aggregate consisting of mollusk shells in which the shells are first treated with a dilute solution of a strong mineral acid and the thus treated aggregate then coated with asphalt. Here again, such is limited to a cut-back asphalt as set forth in column 1.

It has not heretofore been possible to provide a satisfactory additive for asphaltic compositions; particularly hot-mix asphaltic compositions, which would not only react with the conventional amine antistrip materials utilized, but which will form salts with the amines which are highly water and oil insoluble, and bond effectively with all aggregates utilizable in asphaltic compositions.

SUMMARY OF THE INVENTION

The present invention provides an asphaltic composition and the method of making it in which the asphalt is more tightly adhered to the aggregate.

Briefly, the present invention comprises an asphaltic composition comprising an asphalt admixed with an aggregate and at the interface between said asphalt and said aggregate the insoluble reaction product of an amine antistrip and an acidic salt in an amount sufficient to bind said asphalt to said aggregate, said acidic salt being a divalent or trivalent metal salt of an inorganic acid.

The invention also comprises the method of making such a composition comprising coating aggregate with a divalent or trivalent metal salt of an inorganic acid, drying said coated aggregate, admixing said dried aggregate with an asphalt containing an amine antistrip, and reacting said divalent metal salt and said amine antistrip to form an insoluble reaction product at the interface between said asphalt and said aggregate in an amount sufficient to bind said asphalt to said aggregate.

This invention is particularly directed to hot-mix asphaltic compositions.

DETAILED DESCRIPTION

As to the aggregate-containing asphaltic composition, the essential component in order to permit the better adhesion is the reaction product of the amine antistrip and the acidic salt.

As to the asphalt while any asphalt usually used with aggregate can be used such as emulisified asphalts, those used in slurry seal pavement-systems, foamed asphalts, and asphalts used in hot-mix systems. The invention will be described in connection with hot-mix asphalts.

As to the amine antistrip, it can be any that has been conventionally utilized for this purpose in asphaltic compositions, such as those disclosed in the Fowkes and Holmes patents discussed above, as well as in U.S. Pat. No. 2,508,430. For this purpose there have been used primary amines, diamines, triamines, tetramines, polyamines, amido amines, and ethoxoylated diamines. It is preferred to use an amido amine. It is believed that these amine compounds absorb on the mineral surfaces and act to bind the asphaltic material to the aggregate. The difficulty that has existed in the past is that it has not been possible to determine how the amine will function with any particular type of aggregate because its effectiveness as an antistrip depends in large part to whether it can find any absorptive surface on the aggregate. Thus, such amine used alone as an antistrip is not always effective as has been indicated in the prior art patents noted above.

The key and critical element of the present invention is the use of a divalent or trivalent metal salt of an inorganic acid in the asphaltic compositions. The metal preferred is the divalent metal calcium; although, it is possible to utilize other divalent metals of Group II of the Periodic Table such as magnesium, strontium, barium, and beryllium. These other metals are not as satisfactory, they are not as readily available as calcium, and are more costly than the calcium salts that can be prepared.

With respect to the inorganic acid, it is preferred that it be phosphoric acid; although there can be utilized any acid containing a divalent anion (preferably a trivalent anion) which will form a water-soluble acid salt with any of the above-noted metal salts and react with any of the noted amines to form an oil and water-insoluble salt.

With respect to the salts, monocalcium phosphate is the preferred salt in terms of its effectiveness and also low cost. It must be recognized in making roadways, air strips, driveways and the like, that a large amount of hot-mix asphalt is utilized and the economic realities are that any material added to increase the adhesion must be economic as well as environmentally safe. Calcium monophosphate not only meets these requirements as to cost and safety, but, also, is the most effective salt.

With respect to the hot-mix asphaltic material, it can be any conventional bituminous material used in hot-mix asphaltic systems, such as AC-5, AC-10, AC-20, AC-40, 60/70, 85/100, 120/150, or 200/300.

With respect to aggregate, utilization of the divalent metal salts of the present invention permits the use of any aggregate suitable for use with asphalt. Specific examples are East Bacon, Texas Hoban, Wyoming Throwbridge, Wyoming Owl, Wyoming Fort Steel, Texas Maddox, Illinois Limestone, Utah Staker, and Texas Counts. These aggregates are composed of mineral fragments, the minerals in any particular aggregate varying widely, but generally containing one or more of the following: quartzite, granite, chalcedony, feldspar, limestone, silicates, hornblend, quartz, jasper, agate, and rhyolite. In the past certain aggregates have presented problems with amine antistrips and have been known to be difficult to coat.

It is essential in making the product of the present invention that a particular sequence of steps be utilized. Most importantly, the aggregate material utilized must first be coated with a solution of the divalent metal salt of the inorganic acid, such as monocalcium phosphate (MCP). The solvent used is preferably water. This can be accomplished by preparing an aqueous solution of MCP, for example, and coating the aggregate with the same. The aggregate must then be dried and this can be accomplished in any conventional manner leaving a coating of the metal salt on the surface of the aggregate. The aggregate is then admixed with the hot-mix asphalt containing any conventional amine antistrip which has been heated to place the asphalt in a molten, flowable state and it is found that the salt and amine then rapidly react at this temperature to form an amine calcium phosphate salt before the asphalt completely cools; a salt containing an amine functional group, as well as the phosphate groups, at the interface between the asphaltic material and the aggregate. This greatly enhances the effect of the amine antistrip and provides vastly improved adhesion over use of the amine material alone. The temperatures at which hot-mix asphalts are conventionally admixed with aggregates are sufficient to cause the reaction between the amine and acid salt to take place to form the necessary reaction product.

While it is possible to utilize the salt as such, an alternate procedure of coating the aggregate in the case of monocalcium phosphate, for example, is to prepare a solution of calcium hydroxide and phosphoric acid and to add this solution to the aggregate. When the aggregate is heated to drive off the moisture the phosphoric acid reacts with the calcium hydroxide to produce the monocalcium phosphate.

As to proportions, the asphalt and aggregate can be used in any of the proportions conventionally used depending upon the use to be made thereof. Thus for example, roadways, driveways, and others have standards with respect to the strength desired and it is well known in this art what particular proportions of asphalt and aggregate are required to give the desired results as to strength and the like.

With respect to the amount of the acidic salt to be utilized, this can be used in amounts from about 0.005% to 1% by weight based on the weight of the aggregate; preferably about 0.005 to 0.25%. While amounts above that can be utilized, it is not necessary and uneconomic to do so; not only from the cost of the salt involved, but also in terms of removal of moisture in the drying step in order to get the dry aggregate prior to admixing with the hot-mix asphalt.

It is also desirable to add in addition to the salt additional mineral acid of the type set forth above; preferably phosphoric acid, to the composition. It has been found that the use of minor amounts; namely, from about 0.005 to 0.05% by eight of the mineral acid based on the weight of aggregate increases the adhesion.

The invention will be further described in connection with the following examples which are set forth for purposes of illustration only. In these examples the aggregate was treated by the procedure set forth above; i.e., the acid salt was either added to the aggregate or formed in situ; no difference was noted between these two procedures.

EXAMPLE 1

A series of tests were carried out (a through f) in which hot-mix asphaltic compositions were prepared using AC-10 asphalt and Staker aggregate; the Staker aggregate consisting primarily of dolomite with some limestone.

The particular aggregate treatment, the amine added, and percent of stripping that occurred in each test are set forth in Table I below.

TABLE I

| Test | Aggregate Treatment | Asphalt Treatment | Percent Stripped |
|---|---|---|---|
| a | 1% Lime | None | 5% |
| b | 0.05% Monocalcium phosphate (MCP) + 0.01% phosphoric acid (PA) | 0.1% Tallow diamine (TD) | 15% |
| c | 0.05% MCP | 0.1% TD | 35% |
| d | 0.01% PA | 0.1% TD | 70% |
| e | None | 0.1% TD | 90% |
| f | None | None | >90% |

EXAMPLE 2

A series of tests (a through e) were carried out as in Example 1, except that the aggregate used was East Bacon; which aggregate is chiefly rhyolite with some potassium feldspar.

The resuls are set forth in Table II below.

TABLE II

| Test | Aggregate Treatment | Asphalt Treatment | Percent Stripped |
|---|---|---|---|
| a | 0.07% MCP + 0.02% PA | 0.1% TD | 5% |
| b | None | 0.1% TD | 85% |
| c | 0.07% MCP + 0.02% PA | | 70% |
| d | 1% Lime | None | 95% |
| e | None | None | >95% |

EXAMPLE 3

A series of tests (a through e) were carried out as in Example 1, except that the aggregate used was Hoban; which aggregate is about 75% granitic of igneous and metamorphic origin (mica, feldspar, and quartz) and about 25% quartzite.

The results are set forth in Table III below.

TABLE III

| Test | Aggregate Treatment | Asphalt Treatment | Percent Stripped |
|---|---|---|---|
| a | 1% Lime | None | 10% |
| b | 0.05% MCP + 0.01% PA | 0.1% TD | 15% |
| c | None | 0.05% TD | 40% |
| d | None | 0.02% TD | 65% |
| e | None | None | 65% |

EXAMPLE 4

A series of tests was carried out to determine the absorption (or reaction) of the amines on various aggregates; both treated and untreated.

The basic test procedure involved placing the amine in a solution consisting of 90% isopropyl alcohol and 10% water. To this solution was then added the particular treated or untreated aggregate being studied. Treatment was as in Example 1 utilizing 0.07% MCP and 0.07% PA. The aggregate is then removed and the amount of amine remaining in the solution is measured. The amount absorbed (reacted) is the difference between that originally placed in the solution and that remaining after the aggregate was removed. The results of these tests are set forth in Table IV below.

TABLE IV

| | Aggregate Used | Amine Used | Percent Absorbed (Reacted) |
|---|---|---|---|
| a. | Untreated East Bacon | TD | 10 |
| b. | Untreated East Bacon | Amido amine (AA) | 21 |
| c. | Treated East Bacon | TD | 59 |
| d. | Treated East Bacon | AA | 78 |
| e. | Untreated Hoban | TD | 85 |
| f. | Untreated Hoban | AA | 88 |
| g. | Treated Hoban | TD | 90 |
| h. | Treated Hoban | AA | 94 |

These results show the amido amine worked better, particularly with the more difficult to coat East Bacon aggregate.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. An asphaltic composition comprising an asphalt admixed with an aggregate and at the interface between said asphalt and said aggregate the reaction product of an amine antistrip and an acid salt in an amount sufficient to bind said asphalt to said aggregate; said acidic salt being a divalent or trivalent metal salt of an inorganic acid.

2. The composition of claim 1 wherein said asphalt is a hot-mix asphalt and said acidic salt is a divalent metal salt of phosphoric acid.

3. The composition of claim 2 wherein said acid salt is monocalcium phosphate.

4. The composition of claims 1, 2, or 3 wherein said composition also contains phosphoric acid.

5. A hot-mix asphaltic composition comprising a hot-mix asphalt admixed with a dry aggregate and at the interface between said asphalt and said aggregate the reaction product of an amine antistrip and a divalent metal salt of phosphoric acid in an amount sufficient to bind said asphalt to said aggregate.

6. The composition of claim 5 wherein said composition also includes phosphoric acid.

7. The method of making an aggregate-containing asphaltic composition comprising coating said aggregate with a divalent or trivalent metal salt of an inorganic acid, drying said coated aggregate, admixing said dried aggregate with an asphalt containing an amine antistrip, and reacting said salt and said amine to form an insoluble reaction product at the interface of the surfaces of said aggregate and said asphalt.

8. The process of claim 7 wherein said composition also contains phosphoric acid.

9. The process of claim 8 wherein said acid salt is monocalcium phosphate.

10. The process of claims 7, 8, or 9 including the step of adding phosphoric acid with said metal salt to coat said aggregate.

11. The method of making an aggregate-containing hot-mix asphaltic composition comprising coating said aggregate with from about 0.005% to 1% by weight; based on the weight of said aggregate, of a divalent metal salt of phosphoric acid, drying said aggregate, admixing said aggregate with a molten hot-mix asphalt containing an amine antistrip, and permitting said salt and said antistrip to react to form an insoluble metal-amine salt at the interface of the surfaces of said aggregate and said asphalt.

12. The method of claim 11 including adding phosphoric acid to said salt to coat said aggregate.

* * * * *